United States Patent [19]

Magorien

[11] 4,442,863
[45] Apr. 17, 1984

[54] FLUID LINE COUPLING DEVICE

[75] Inventor: Vincent G. Magorien, Granada Hills, Calif.

[73] Assignee: Systron Donner Corp., Concord, Calif.

[21] Appl. No.: 258,919

[22] Filed: Apr. 30, 1981

[51] Int. Cl.³ .............................................. F16L 29/00
[52] U.S. Cl. ............................. 137/614.03; 251/149.5; 251/149.8; 251/210
[58] Field of Search ............... 251/149.5, 149.6, 149.8, 251/210; 137/614.03

[56] References Cited

U.S. PATENT DOCUMENTS

| 3,073,342 | 1/1963 | Magorien | 137/614.03 |
| 3,155,370 | 11/1964 | Drumm et al. | 251/149.5 |
| 3,500,859 | 3/1970 | Pearson | 251/149.8 |
| 3,530,887 | 9/1970 | Stratman | 251/210 |
| 3,871,404 | 3/1975 | Covrant | 137/614.03 |
| 4,327,770 | 5/1982 | Brown et al. | 137/614.03 |

Primary Examiner—A. Michael Chambers
Attorney, Agent, or Firm—Fulwider, Patton, Rieber, Lee & Utecht

[57] ABSTRACT

An improved fluid line connector in which an O ring seal (64) in a male portion (10) of the connector is better protected against failure in high-pressure or high-flow conditions. The seal is peripherally surrounded over more than half its thickness by a retainer (70) having an annular peripheral lip (72). In the sealed condition, reaction forces acting through the seal hold the lip (72) away from the valve seat structure while still permitting a perfect seal, and in the connected condition the retainer (70) provides maximum protection against washing out of the seal. In addition, a retainer securing ring (76) limits movement of the retainer (70) and further minimizes seal washout.

8 Claims, 5 Drawing Figures

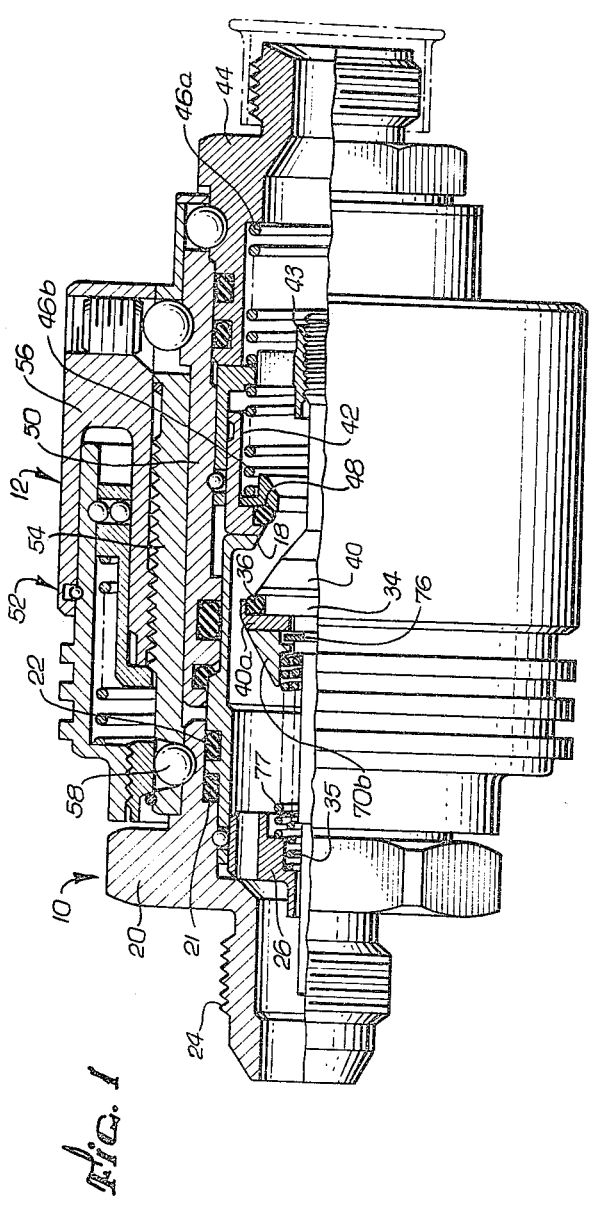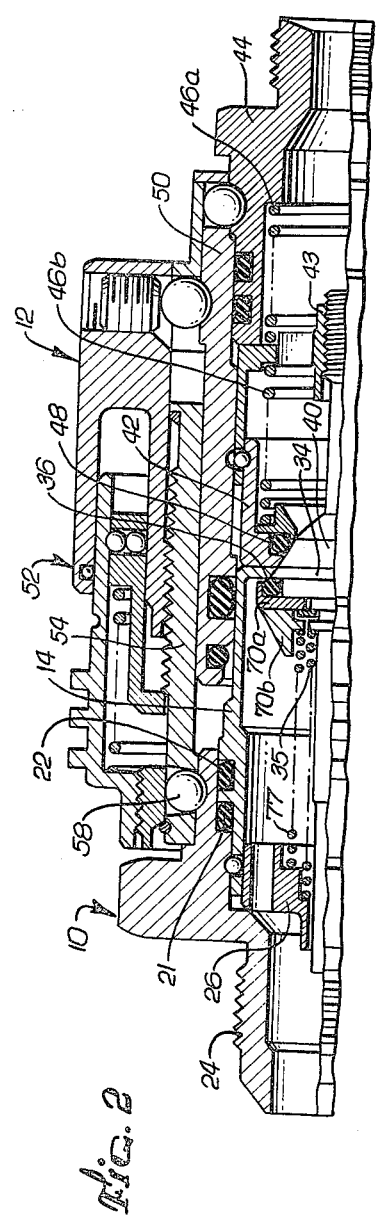

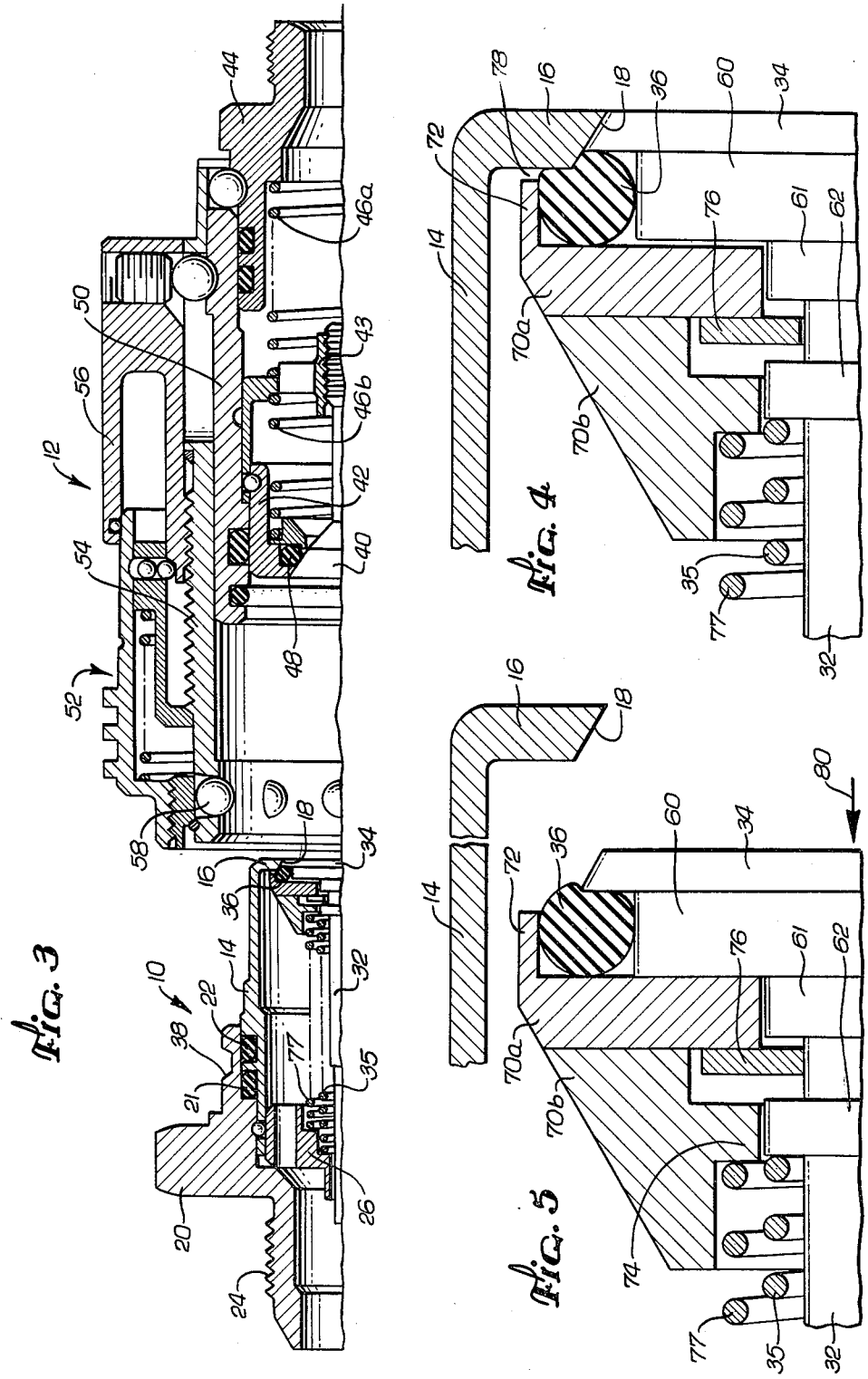

FLUID LINE COUPLING DEVICE

This invention relates generally to an improved connector for releasably connecting two lines for carrying a fluid, which may be liquid or a gas. More particularly, the invention relates to an improved connector of the type that provides for practically zero spillage of fluid during connection or disconnection. Such a device is disclosed in U.S. Pat. No. 3,073,342. Basically, in devices of this type, there is a male half and a female half, each of which includes a spring-loaded valve to seal fluid inside the connector element. During connection, the male half is inserted into the female half and is held therein by a detent mechanism prior to opening of the valves. The valves are then opened simultaneously, by either pushing or rotating a movable portion of the female half. To minimize spillage of fluid to practically zero, each of the valves in the male and female halves closes to form a perfectly flat end surface. During connection and disconnection, the two end surfaces are in surface contact with each other, and spillage is practically eliminated.

The invention is particularly concerned with the valve sealing arrangement in the male half of a connector of this type. In simple terms, the male element includes a generally tubular body, with an end wall having an opening through it in the form of a conical valve seat. A tapered valve is mounted for sliding axial movement within the tubular body and is biased by a spring into a closed, or disconnected, position in which the valve is engaged with the valve seat. The valve and the end wall together present a practically continuous flat surface at the end of the male half. Although metal-to-metal seals are employed in some types of fluid line connectors, a more reliable seal can be obtained using an O-ring of conventional design. One practical difficulty with the O-ring design, however, is that it is difficult to maintain a desired flush fit for the valve. One must either use a relatively strong biasing force to compress the O-ring after it makes contact with the valve seat, or mount the O-ring in such a manner that it can be biased into a sealing position independently of the biasing means used to close the valve.

Even if the foregoing difficulty is overcome by using separate biasing for the O-ring seal, it has a tendency to be stretched and "washed out," i.e., removed from its intended position in an annular groove or ledge on the valve, during connection under high pressure or during high flow conditions once connection has been made. During a surge in flow, locally high pressures in the vicinity of the O-ring, typically caused by a venturi effect, can literally lift the seal from its proper position, after which it can be carried along with the flow. To minimize these problems, some prior designs have utilized a seal retainer in the form of a cupped element with a peripheral lip which partly encloses the seal around its outer circumference, in an effort to prevent its being washed away from its proper position. In the past, however, the design of such retaining elements has been subject to significant limitations. First, the extent to which the retaining lip protrudes around the seal has had to be significantly less than half the cross-sectional diameter of the seal, to avoid having the retainer lip interfere with the valve seat. Furthermore, the retainer, which is typically independently slidable and independently spring-biased, to ensure that a flush fit is still maintained for the valve, can sometimes be forced too far back during high flow conditions. Therefore, "washout" of the seal can still occur. Accordingly, there has been a significant need for a connector which minimizes these seal washout problems, and is capable of connection under high pressure and operation under high flows. The present invention satisfies this need.

SUMMARY OF THE INVENTION

The present invention resides in a fluid line connector having a male connector half in which the valve seal is retained by a cupped retainer extending axially for more than half the cross-sectional diameter of the seal, to provide maximum protection for the seal in the connected condition. In the disconnected condition, when the valve is closed, the retainer slides axially to expose a greater area of the seal and to avoid interference between the retainer and the valve seat. Furthermore, in accordance with another aspect of the invention, the extent of sliding motion of the retainer is limited, in order to prevent movement into an inoperative position during high flow conditions.

Basically, and in general terms, the improved male half of the connector includes a tubular body having an end wall with an opening therein forming a conical valve seat, and a valve having a corresponding concially tapered surface and a valve stem mounted for axial movement within the tubular body, the valve engaging the valve seat in such a manner that the external faces of the end wall and the valve form a continuous flush surface. In addition, the male half of the connector includes an O-ring seal disposed on the valve on an annular shoulder adjacent to the conical valve surface, and a cupped seal retainer mounted for sliding movement on the valve stem and having an annular lip extending around the seal for more than half of its cross-sectional diameter.

The male half of the connector also includes first spring biasing means effective to bias the valve toward a sealed position on the valve seat, and second spring biasing means for biasing the seal retainer, and with it the seal, toward the valve seat. Also included is a retainer securing means for limiting sliding movement of the retainer and thereby preventing complete removal of the retainer from around the seal. In the disconnected condition, the valve is biased into its flush position against the valve seat, and the seal is urged against the valve seat by the second spring biasing means acting through the retainer. The retainer, seal and valve seat are so dimensioned that there is a clearance, even in the sealed position, between the lip of the retainer and the inside surface of the end wall of the tubular body. Compression of the seal produces a reaction force tending to move the retainer away from the valve seat, thereby further reducing the possibility of interference between the retainer and the valve seat or end wall.

When the valve is opened, by an axial force transferred from the female valve, the second spring biasing means urges the retainer into a position of maximum protection of the seal, thereby minimizing the likelihood of seal washout by transient surges in fluid flow. Although very high pressure surges during high flow conditions could move the retainer slidably along the valve stem, this motion is limited by the retainer securing means, which takes the form of a snap-ring engaging a portion of the valve stem. Thus, the retainer can never completely lose its effectiveness in conditions of high flow.

It will be appreciated from the foregoing that the present invention represents a significant advance in the field of fluid line connectors. In particular, it significantly reduces the possibility of loss of O-ring seals during conditions of high pressure on connection of the device, or high flow after connection. Other aspects and advantages of the invention will become apparent from the following more detailed description, taken in conjunction with the accompanying drawings.

BRIEF DESCRIPTION OF THE DRAWINGS

FIG. 1 is a longitudinal elevational view, drawn partly in section, of a fluid line connector embodying the present invention and shown in a fully connected condition;

FIG. 2 is a fragmentary elevational view, partly in section and similar to FIG. 1, but showing the connector in a partly connected condition;

FIG. 3 is a fragmentary elevational view, partly in section and similar to FIGS. 1 and 2, but showing the connector in a fully disconnected condition;

FIG. 4 is a fragmentary sectional view, drawn to an enlarged scale with respect to FIGS. 1–3, showing the valve sealing arrangement in the male half of the connector in a disconnected condition; and FIG. 5 is a fragmentary sectional view similar to FIG. 4, but showing the valve sealing arrangement in the male half of the connector in a connected condition.

DESCRIPTION OF THE PREFERRED EMBODIMENT

As shown in the drawings for purposes of illustration, the present invention is concerned with connectors or couplings for fluid lines. In many applications, fluid lines have to be connected or disconnected without shutting off the fluid supply pressure and, ideally, without spilling any fluid.

Such connectors are used, for example, in aircraft hydraulic systems to connect various components of the hydraulic system in an aircraft, or to connect with ground servicing equipment. Either or both sides of a connector may be subjected to fluid pressure before the connection is made. Moreover, the requirement for zero spillage, although sometimes only for a matter of convenience, may be critical in some applications, especially if the fluid is a toxic one.

Although fluid line connectors of this general type have been in use for many years, connectors prior to the present invention have been limited in their ability to connect to high pressures and to withstand high flow rates. Connection under pressures of several hundred pounds per square inch (p.s.i.), and the ability to withstand high flow conditions creating as much as 100 p.s.i. pressure drop across the connector, have imposed significant demands on the performance of the seals used in the connector, particularly the valve seal used in the male half. More specifically, the tendency of the O-ring seal in the male half to "wash-out" under high pressure or high flow conditions has been a significant limitation on the use of these connectors in such conditions.

As shown in FIG. 3, the connector of the general type with which this invention is concerned comprises a male half, referred to generally by reference numeral 10, and a female half 12. This invention relates to improvements in the sealing arrangement of a valve in the male portion 10, but so that the environment of the invention can be better understood, operation of the complete connector device will be briefly described.

The male portion 10 comprises a generally cylindrical body 14 having an integral end wall 16 with a tapered opening therein forming a conical valve seat 18. The cylindrcial body 14 is secured in a generally tubular housing 20 and is sealingly engaged with the housing by means of two O-ring seals 21 and 22. The housing 20 is dimensioned at one end to receive the body 14 therein, and has at its other end a male threaded coupling 24. An insert 26 is rigidly secured inside the cylindrical body 14 and the housing 20. A valve stem 32 slidingly engages a central hole through the insert, and a tapered valve 34, integral with the stem 32, engages the valve seat 18 when in the disconnected condition shown in FIG. 3. A compression spring 35 bears on the insert 26 and the valve 34, biasing it outward into a sealed position, in which the outer surfaces of the valve and the end wall 16 present a continuous flush surface. An O-ring 36 seals against the valve seal 18. The housing 20 includes one or more external recesses 38, near the end that receives the cylindrical body 14. The recesses form part of a detent mechanism to be explained below.

The female portion 12 also includes a conically shaped valve 40 which, in the disconnected condition, is seated in a generally cylindrical member 42. This valve 40, however, opens outwardly rather than inwardly and is tapered in the opposite direction to the valve 34. The valve 40 is rigidly connected to a female valve body 44 and the body 44 is biased by a spring 46 to maintain the valve in a sealed condition. An O-ring seal 48 seals the female valve 40 closed in the disconnected condition. Because the O-ring 48 can be closely retained at all times, seal washout problems in the female half 12 are easier to control. The cylindrical member 42 is itself slidingly fitted inside another tubular member 50, which is rigidly secured to the body 44. Surrounding the cylindrical member 50 is an assembly 52, one purpose of which is to draw the two halves 10 and 12 into a fully connected position. The assembly 52 includes a threaded tube 54 capable of sliding movement over the body 50, and an actuating sleeve 56 which threadably engages the tube 54 and is mounted for rotation about the body 44 and the tubular member 50.

At the leading end portion of the cylinder 54 are mounted a plurality of retaining balls 58. The balls 58 are mounted on the inner surface of the tube 54 and are biased radially inward. When the male and female portions 10 and 12 are initially placed together, the balls 58 engage in the recesses 38 on the male portion 10. Then, when the actuating sleeve 56 is rotated, the tube 54 is drawn back towards the female portion 12, and carries with it the male housing 20 and male cylindrical body 14. The end 16 of the male portion 10 then contacts the end of the cylindrical member 42 in the female portion 12, substantially as shown in FIG. 2. On further rotation of the actuating sleeve 56, the cylindrical body 14 of the male portion and the cylindrical member 42 of the female portion continue to move to the right with respect to the body 44 of the female portion. In this manner, the male valve 34 is opened against the force of its spring 28, and the female valve 40 is similarly opened against the force of the spring 46, until the connector attains the fully connected condition, as shown in FIG. 1.

In accordance with the invention, the male portion 10 includes a seal retainer, having portions 70a and 70b, the portion 70a having a peripheral retaining lip 72 extending around the O-ring seal for more than half of its cross-sectional diameter. The lip 72 retains and protects the seal 36, virtually eliminating seal "washout" problems.

As shown more clearly in FIGS. 4 and 5, the valve 34 includes an integral reduced-diameter shoulder 60 adjacent to the tapered valve 34. Adjacent to this portion 60 is a further reduced-diameter shoulder 61, and spaced from that is a flange 62 against which the compression spring 35 bears. Between the shoulder 61 and the flange 62 the valve has approximately the same diameter as the stem 32. The O-ring 36 is disposed around the shoulder 60 and against the larger diameter face of the valve 34.

The portion 70a of the seal retainer has an internal diameter to fit slidingly over the shoulder 61 of the valve and is slightly thicker in an axial direction than the axial length of the shoulder. The other portion 70b of the seal retainer abuts the portion 70a and includes an internal annular flange 74, the internal diameter of which fits slidingly over the flange 62 on the valve. A snap-ring 76 is positioned in the annular space between the flange 62 and the shoulder 61 of the valve, and is significantly thinner in an axial direction than the space in which it resides. THe snap-ring 76 extends radially out into the space between the portions 70a and 70b of the retainer. An outer compression spring 77, concentric with spring 35, is disposed between the insert 26 and the flange 74 on the portion 70b of the seal retainer. The spring 77 therefore urges the retainer portions 70a and 70b, and the seal 36, toward the valve seat 18.

In the disconnected condition, as shown in FIG. 4, the valve 34 is biased into the valve seat 18 by the spring 35, and a flush, continuously flat surface is formed by the outer face of the valve and the end surface 16 of the body 14. The outer spring 77, acting through the retainer 70b and 70a, holds the O-ring seal 36 sealingly against the valve seat 18. The seal 36 is so dimensioned that, when in this disconnected position, a reaction force transmitted through the seal from the valve seal 18 tends to move the retainer portion 70a further away from the shoulder 60 of the valve, leaving a small clearance between them. More importantly, a clearance space, indicated by numeral 78 is maintained between the lip 72 of the retainer and the end wall 16 of the body 14.

In the connected or open position of the valve 34, force is exerted on the valve in the left-hand direction, as shown in FIG. 5 by the arrow 80, compressing the spring 35. The retainer spring 77 acting through retainer portions 70a and 70b, tends to compress the seal 36 against the back of the valve 34, and in so doing extends the lip 72 to a maximum extent around the periphery of the seal. In this manner, the seal is effectively tucked away behind the lip 72 during the open condition, and any possibility of seal washout is practically eliminated.

Further protection against seal washout is provided by the snap-ring 76, which limits movement of the retainer 70a and 70b. The seal 36 is, therefore, never completely unprotected, even in conditions of maximum flow and transient surge flow.

It will be appreciated from the foregoing that the present invention represents a significant advance in the field of fluid line connectors. In particular the invention provides for significant minimization of seal washout in the male portion of such a connector, without detracting from its other performance features. It will also be appreciated that, although a specific embodiment of the invention has been described in detail for purposes of illustration, various aspects may be modified without departing from the spirit and scope of the invention. Accordingly, the invention is not to be limited except as by the appended claims.

I claim:

1. In a fluid line connector having a male half and a female half, each separately valved to open as the halves are connected and to close as the halves are disconnected, an improved male valve assembly, comprising:
   a tubular body having an end wall with an opening therein forming a conical valve seat;
   a valve having a corresponding concially tapered surface, an annular shoulder adjacent to said tapered surface and a valve stem mounted for axial sliding movement within said tubular body;
   an O-ring seal disposed on said annular shoulder of said valve;
   a cupped seal retainer mounted for sliding movement along said valve stem and having an annular retaining lip capable of extending around said seal over more than half of its thickness;
   first biasing means for urging said valve into engagement with said valve seat; and
   second biasing means for urging said seal retainer, and with it said seal, into sealing engagement with said valve seat when in the disconnected condition;
   wherein said seal retainer is prevented from interfering with said end wall by reaction forces generated by said seal in the disconnected condition, and wherein said seal retainer retains said seal to an even greater extent in the connected condition, thereby minimizing seal washout in conditions of high flow.

2. An improved male valve assembly as set forth in claim 1, and further including retainer securing means to limit sliding movement of said seal retainer, and thereby prevent said seal retainer from completely exposing said seal, even in high flow or high pressure conditions.

3. An improved male valve assembly as set forth in claim 2, wherein:
   said retainer securing means includes a snap-ring disposed in a groove in said valve stem.

4. In a fluid line connector having a male half and a female half, each separately valved to open as the halves are connected and to close as the halves are disconnected, the male half having a valve, a valve seat, an O-ring seal, a seal retainer, first biasing means for urging the valve into engagement with the valve seat, and second biasing means fo urging the seal retainer and seal against the valve seat, the improvement comprising:
   a peripheral retaining lip on said seal retainer extending around said seal for more than half of its thickness, even when the halves of the connector are connected together, to minimize seal washout during connection under high-pressure conditions and during high-flow conditions while connected;
   wherein said seal is dimensioned to provide a reaction force against said seal retainer when urged against said valve seat, ensuring that there is no interference between said retainer lip and any portion of said valve seat.

5. A male-half valve assembly for use in a fluid line connector, said assembly comprising:
   a tubular body having an end wall with an opening therein forming a conical valve seat;
   a valve having a corresponding conically tapered surface, an annular shoulder adjacent to said surface, a valve stem mounted for axial sliding movement within said tubular body and a second annular shoulder adjacent said first-mentioned shoulder;

an O-ring seal disposed on said first annular shoulder;

a cupped seal retainer mounted for sliding movement on said second annular shoulder and having an annular retaining lip extending over said seal for more than half of its thickness;

a first compression spring positioned to apply an axial force to said valve through said second shoulder; to bias said valve into engagement with said valve seat; and a second compression spring positioned to apply an axial force to said retainer and thereby to said seal, to urge the latter into sealing engagement with said valve seat independently of said valve;

wherein said seal retainer is prevented from interfering with said valve seat by reaction forces transmitted through said seal when in sealing engagement with said valve seat, and wherein said seal retainer surrounds said seal to an even greater extent when said valve is in an open condition and said retainer is urged fully against said first annular shoulder.

6. A male-half valve assembly as set forth in claim 6, wherein:

said second shoulder has an annular groove therein dividing said shoulder into first and second portions;

said seal retainer includes a first portion with said retaining lip, positioned for sliding movement on said first portion of said second shoulder, said second retainer portion abutting said first retainer portion except along an internal annular gap corresponding approximately to the position of said annular groove; and said assembly includes a snap-ring fitted into said groove and projecting out from said second annular shoulder to contact said second retainer portion and limit its axial movement away from said seal.

7. In a fluid line connector having a male half and a female half, each separately valved to open as the halves are connected and to close as the halves are disconnected, the male half having a valve, a valve seat, an O-ring seal, a seal retainer, first biasing means for urging the valve into engagement with the valve seat, and second biasing means for urging the seal retainer and seal against the valve seat, the improvement comprising:

a peripheral retaining lip on said seal retainer extending around said seal for more than half of its thickness, to minimize seal washout during connection under high-pressure conditions and during high-flow conditions while connected; and retainer securing means to limit sliding movement of said seal retainer, and thereby prevent said seal retainer from completely exposing said seal, even in high-flow or high-pressure conditions;

wherein said seal is dimensioned to provide a reaction force against said seal retainer when urged against said valve seat, ensuring that there is no interference between said retainer lip and any portion of said valve seat.

8. The improvement set forth in claim 7, wherein said retainer securing means includes a snap-ring disposed in a groove in said valve.

* * * * *